US012574940B2

(12) United States Patent (10) Patent No.: US 12,574,940 B2

Yoon et al. (45) Date of Patent: Mar. 10, 2026

(54) METHOD AND APPARATUS FOR SCHEDULING IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Taehyoung Kim, Suwon-si (KR); Seho Myung, Suwon-si (KR); Jeongho Yeo, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 474 days.

(21) Appl. No.: 18/078,254

(22) Filed: Dec. 9, 2022

(65) Prior Publication Data

US 2023/0103808 A1 Apr. 6, 2023

Related U.S. Application Data

(63) Continuation of application No. PCT/KR2021/007185, filed on Jun. 9, 2021.

(30) Foreign Application Priority Data

Jun. 9, 2020 (KR) ........................ 10-2020-0069404

(51) Int. Cl.
*H04W 72/231* (2023.01)
*H04W 72/0453* (2023.01)
(52) U.S. Cl.
CPC ..... *H04W 72/231* (2023.01); *H04W 72/0453* (2013.01)

(58) Field of Classification Search
CPC ............ H04W 16/10; H04W 72/0453; H04W 72/1273; H04W 72/23; H04W 72/231; H04W 72/232
See application file for complete search history.

(56) References Cited

U.S. PATENT DOCUMENTS 8,625,558 B2 1/2014 Lin
9,137,796 B2 9/2015 Yang et al.
(Continued)

FOREIGN PATENT DOCUMENTS

EP 2525597 B1 8/2015
KR 10-2300046 B1 9/2021
WO 2020/033647 A1 2/2020

OTHER PUBLICATIONS

Communication issued Oct. 23, 2023 by the European Patent Office in European Patent Application No. 21822009.3.
(Continued)

*Primary Examiner* — Eric Nowlin
(74) *Attorney, Agent, or Firm* — Sughrue Mion, PLLC

(57) ABSTRACT

A method of a terminal in a wireless communication system includes receiving a radio resource control (RRC) message, identifying, from the RRC message, information on a scheduling cell and a format for downlink control information (DCI) to be received, receiving, from the scheduling cell, the DCI in the identified format, and receiving data via multiple cells based on the received DCI, where the DCI comprises frequency domain resource assignment information for physical downlink shared channels (PDSCHs).

15 Claims, 14 Drawing Sheets

(56) References Cited

U.S. PATENT DOCUMENTS

| | | | |
|---|---|---|---|
| 9,225,503 B2 | 12/2015 | Kim et al. | |
| 9,351,293 B2 | 5/2016 | Chen et al. | |
| 10,462,772 B2 | 10/2019 | Feng et al. | |
| 11,082,984 B2 * | 8/2021 | Khoshnevisan | H04B 7/024 |
| 11,139,926 B2 * | 10/2021 | Aiba | H04W 76/11 |
| 11,297,674 B2 * | 4/2022 | He | H04L 5/0048 |
| 11,979,865 B2 * | 5/2024 | Muruganathan | H04W 72/23 |
| 12,075,433 B2 * | 8/2024 | Zhang | H04W 72/23 |
| 12,137,459 B2 * | 11/2024 | Noh | H04L 5/0035 |
| 2012/0009923 A1 | 1/2012 | Chen et al. | |
| 2013/0028108 A1 | 1/2013 | Wu et al. | |
| 2014/0079008 A1 | 3/2014 | Park | |
| 2014/0362811 A1 | 12/2014 | Lin et al. | |
| 2015/0341914 A1 | 11/2015 | Lee et al. | |
| 2016/0338023 A1 | 11/2016 | Nogami et al. | |
| 2018/0132218 A1 | 5/2018 | Yokomakura et al. | |
| 2018/0145815 A1 * | 5/2018 | Takeda | H04W 28/04 |
| 2018/0159675 A1 * | 6/2018 | Yang | H04L 5/00 |
| 2019/0254110 A1 * | 8/2019 | He | H04L 41/0896 |
| 2019/0349142 A1 * | 11/2019 | Aiba | H04L 1/1819 |
| 2019/0357238 A1 | 11/2019 | Zhou et al. | |
| 2020/0119886 A1 | 4/2020 | Seo et al. | |
| 2020/0228263 A1 * | 7/2020 | Khoshnevisan | H04W 72/1273 |
| 2020/0404667 A1 * | 12/2020 | Khoshnevisan | H04L 5/0035 |
| 2021/0235453 A1 * | 7/2021 | Matsumura | H04W 72/0453 |
| 2021/0266944 A1 * | 8/2021 | Noh | H04L 5/0094 |
| 2021/0352501 A1 | 11/2021 | Taherzadeh Boroujeni et al. | |
| 2022/0085939 A1 * | 3/2022 | Mondal | H04W 72/21 |
| 2022/0095304 A1 * | 3/2022 | Muruganathan | H04W 72/23 |
| 2022/0116247 A1 * | 4/2022 | Sengupta | H04L 5/0051 |
| 2022/0159629 A1 * | 5/2022 | Sengupta | H04L 5/0053 |
| 2022/0167321 A1 * | 5/2022 | Zhang | H04W 72/23 |
| 2022/0400505 A1 * | 12/2022 | Matsumura | H04W 72/1273 |
| 2023/0022602 A1 * | 1/2023 | Zhu | H04W 72/0453 |
| 2023/0081293 A1 * | 3/2023 | Li | H04W 72/044 |
| | | | 370/329 |
| 2023/0103808 A1 * | 4/2023 | Yoon | H04W 72/0453 |
| | | | 370/329 |
| 2024/0057111 A1 * | 2/2024 | Lin | H04L 5/0053 |
| 2024/0364472 A1 * | 10/2024 | Venugopal | H04B 7/0626 |

OTHER PUBLICATIONS

Qualcomm Incorporated, "TP for Enhancements to Scheduling and HARQ operation for NR-U", 3GPP TSG RAN WG1 Meeting #100bis-e, RI-2002432, Apr. 20-30, 2020, Agenda Item: 7.2.2.2.3. (8 pages total).

Search Report (PCT/ISA/210) issued Sep. 24, 2021 by the International Searching Authority for International Patent Application No. PCT/KR2021/007185.

Written Opinion (PCT/ISA/237) issued Sep. 24, 2021 by the International Searching Authority for International Patent Application No. PCT/KR2021/007185.

"3rd Generation Partnership Project; Technical Specification Group Radio Access Network; NR; Physical layer procedures for data (Release 16)", 2020, 3GPP TS 38.214 V16.1.0, 153 pages total.

Huawei, HiSilicon, "NR CA enhancements and DSS", 2019, 3GPP TSG RAN Meeting #86, RP-192797, 2 pages total.

Ericsson, "New WID on NR Dynamic spectrum sharing (DSS)", 2019, 3GPP TSG RAN Meeting #86, RP- 193260, 4 pages total.

Communication dated Aug. 20, 2025 issued by the Korean Intellectual Property Office in Korean Patent Application No. 10-2020-0069404.

"3rd Generation Partnership Project; Technical Specification Group Radio Access Network; NR; Radio Resource Control (RRC) protocol specification (Release 16)", 3GPP TS38.331 v16.0.0 (Mar. 2020), pp. 1-836 (836 pages total).

"3rd Generation Partnership Project; Technical Specification Group Radio Access Network; NR; Multiplexing and channel coding (Release 16)", 3GPP, TS38.212 v16.1.0 (Mar. 2020), pp. 1-146 (146 pages total).

Qualcomm Incorporated, "TP for Enhancements to Scheduling and HARQ operation for NR-U", 3GPP TSG RAN WG1 #100bis, Apr. 20-30, 2020, R1-2002532 (8 pages total).

* cited by examiner

510

610

<u>710</u>

METHOD AND APPARATUS FOR SCHEDULING IN WIRELESS COMMUNICATION SYSTEM

CROSS-REFERENCE TO RELATED APPLICATION(S)

This application is a continuation application, claiming priority under § 365(c), of an International application No. PCT/KR2021/007185, filed on Jun. 9, 2021, which is based on and claims the benefit of a Korean patent application number 10-2020-0069404, filed on Jun. 9, 2020, in the Korean Intellectual Property Office, the disclosure of each of which is incorporated by reference herein in its entirety.

TECHNICAL FIELD

The disclosure relates generally to a wireless communication system and, more particularly, to a scheduling method and device for dynamic spectrum sharing (DSS).

BACKGROUND ART

To meet the demand for wireless data traffic having increased since deployment of 4$^{th}$ generation (4G) communication systems, efforts have been made to develop an improved 5$^{th}$ generation (5G) 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (MIMO), full dimensional MIMO (FD-MIMO), array antenna, analog beam forming, large scale antenna techniques are used in related art 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud RAN as the above-described big data processing technology may also be considered an example of convergence of the 5G technology with the IoT technology.

Due to increase in the number of terminals in a network, scheduling capacity may be insufficient, and a method for solving this may be required.

DISCLOSURE OF INVENTION

Technical Problem

Provided is a method for scheduling a physical downlink shared channel (PDSCH) for multiple cells by using downlink control information transmitted via a physical downlink control channel (PDCCH) of one cell in a wireless communication system.

Solution to Problem

Additional aspects will be set forth in part in the description which follows and, in part, will be apparent from the description, or may be learned by practice of the presented embodiments.

According to an aspect of the disclosure, a method of a terminal in a wireless communication system may include receiving a radio resource control (RRC) message, identifying, from the RRC message, information on a scheduling cell and a format for downlink control information (DCI) to be received, receiving, from the scheduling cell, the DCI in the identified format, and receiving data via multiple cells based on the received DCI, where the DCI comprises frequency domain resource assignment information for physical downlink shared channels (PDSCHs).

The DCI may further include indices of the multiple cells, and frequency domain resource assignment information for PDSCHs corresponding to the multiple cells.

The DCI may further include frequency domain resource assignment information for PDSCHs corresponding to the multiple cells, and frequency domain resource assignment information for PDSCHs corresponding to the multiple cells.

In case that a cell that does not schedule a PDSCH is included in the multiple cells, the DCI may indicate a predesignated value for the frequency domain resource assignment information for the PDSCHs.

The RRC message may further include at least one of a number of pieces of the frequency domain resource assignment information for the PDSCHs, an indication as to whether cell index combination information is included, and a number of cell indices included in the DCI.

According to an aspect of the disclosure, a terminal in a wireless communication system may include a transceiver and a controller configured to receive a RRC message via the transceiver, identify, from the RRC message, information on a scheduling cell and a format for DCI to be received, receive, from the scheduling cell, the DCI in the identified format, and receive data via multiple cells based on the DCI, where the DCI includes frequency domain resource assignment information for PDSCHs.

The DCI may further include indices of the multiple cells, and frequency domain resource assignment information for PDSCHs corresponding to the multiple cells.

The DCI may further include frequency domain resource assignment information for PDSCHs corresponding to the multiple cells, and frequency domain resource assignment information for PDSCHs corresponding to the multiple cells.

In case that a cell that does not schedule a PDSCH is included in the multiple cells, the DCI may indicate a predesignated value for the frequency domain resource assignment information for the PDSCHs.

The RRC message may further include at least one of a number of pieces of the frequency domain resource assignment information for the PDSCHs, an indication as to whether cell index combination information is included, and a number of cell indices included in the DCI.

According to an aspect of the disclosure, a base station in a wireless communication system may include a transceiver and a controller configured to transmit DCI to a terminal by the transceiver via a scheduling cell of the terminal, and transmit data via multiple cells, based on the DCI, where the DCI includes frequency domain resource assignment information for PDSCHs.

The controller may be further configured to transmit a RRC message comprising information on a format of the DCI to be received by the terminal and information on the scheduling cell.

The DCI may further include indices of the multiple cells, and frequency domain resource assignment information for PDSCHs corresponding to the multiple cells.

The DCI may further include frequency domain resource assignment information for PDSCHs corresponding to the multiple cells, and frequency domain resource assignment information for PDSCHs corresponding to the multiple cells.

In case that a cell that does not schedule a PDSCH is included in the multiple cells, the DCI may indicate a predesignated value for the frequency domain resource assignment information for the PDSCHs.

Based on the method of scheduling physical downlink shared channels (PDSCHs) of multiple cells via a physical downlink control channel (PDCCH) of one cell in a wireless communication system provided herein, scheduling for a terminal can be performed by efficiently using radio resources.

BRIEF DESCRIPTION OF DRAWINGS

The above and other aspects, features, and advantages of certain embodiments of the present disclosure will be more apparent from the following description taken in conjunction with the accompanying drawings, in which.

MODE FOR THE INVENTION

Figure 1:
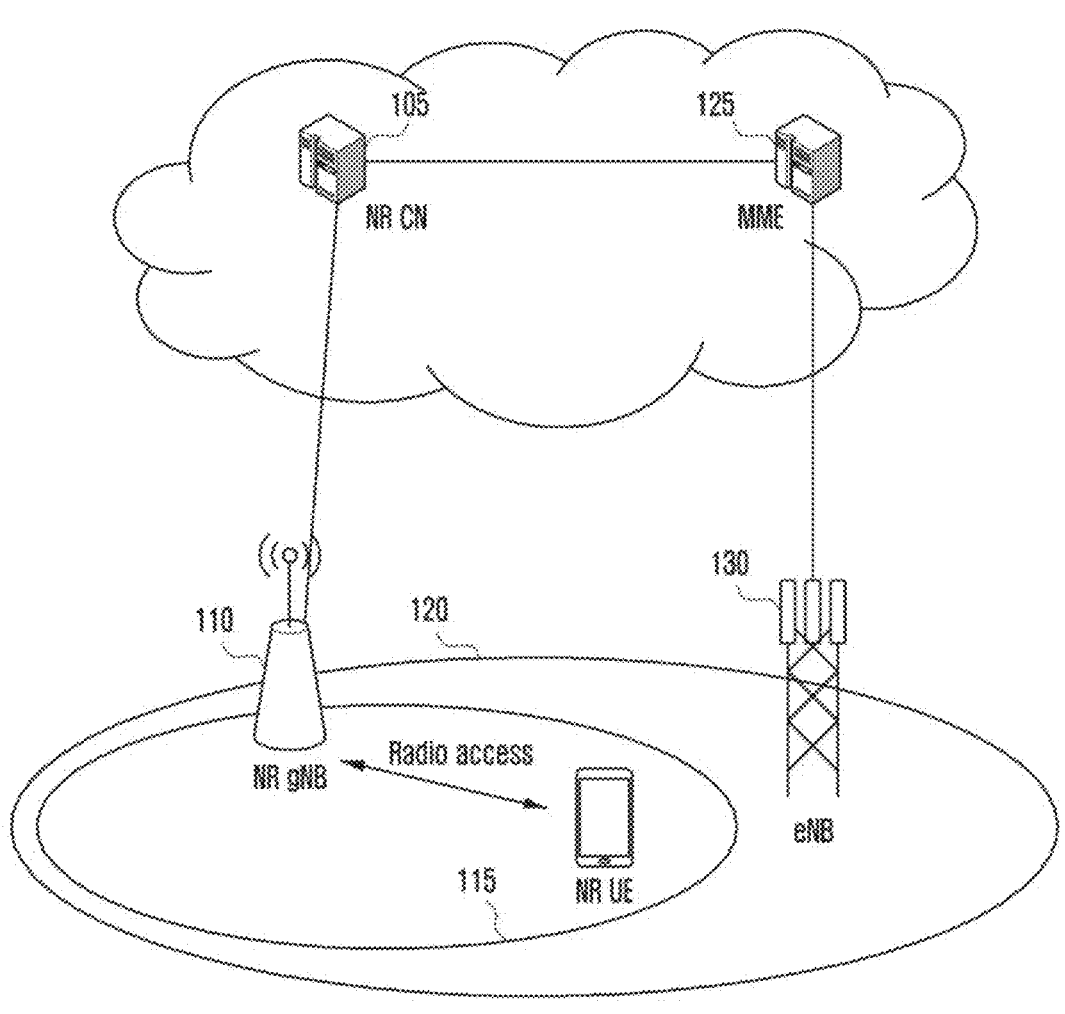
FIG. 1 is a diagram illustrating a structure of a next-generation mobile communication system according to an embodiment of the disclosure.

Hereinafter, embodiments of the disclosure will be described in detail with reference to the accompanying drawings.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Furthermore, according to some embodiments, the "unit" may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include an electronic device, a user equipment (UE), a mobile station (MS), a cellular phone, a smartphone, a computer, or a multimedia system capable of performing communication functions. Of course, examples of the base station and the terminal are not limited thereto. Hereinafter, a description will be given of a technology for receiving broadcast information from a base station by a terminal in a wireless communication system. The disclosure relates to a communication technique for converging Internet of Things (IoT) technology with $5^{th}$ generation (5G) communication systems designed to support a higher data transfer rate beyond $4^{th}$ generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project (3GPP) long term evolution (LTE) standards may be used for the convenience of description. However, the disclosure is not limited by these terms and names, and may be applied in the same way to systems that conform other standards.

FIG. 1 is a diagram illustrating a structure of a next-generation mobile communication system according to an embodiment of the disclosure.

Referring to FIG. 1, a radio access network of the next-generation mobile communication system (hereinafter, new radio (NR) or 5G) may include a next-generation base station (a new radio node B, hereinafter, an NR gNB or an NR base station) 110 and a next-generation radio core network (a NR core network (NR CN)) 105. A next-generation radio user terminal (a NR user equipment (NR UE) or terminal) 115 may access an external network via the NR gNB 110 and the NR CN 105.

In FIG. 1, the NR gNB 110 may correspond to an evolved node B (eNB) of a long term evolution (LTE) system. The NR gNB 110 may be connected to the NR UE 115 via a radio channel and may provide a service superior to that of related art Node B. In the next-generation mobile communication system, all user traffic may be serviced via a shared channel. Therefore, there is a need for a device which collects state information, such as buffer states, available transmission power states, and channel states of UEs, to perform scheduling, and the NR gNB 110 may be in charge of this. A single NR gNB may control multiple cells. In the next-generation mobile communication system, in order to implement ultra-fast data transmission compared to the current LTE, a bandwidth greater than or equal to a current maximum bandwidth may be applied. A beam-forming technology may be additionally incorporated using orthogonal frequency division multiplexing (OFDM) as a radio access technology. Further, an adaptive modulation & coding (AMC) scheme that determines a modulation scheme and a channel coding rate according to a channel state of a terminal may be applied.

The NR CN 105 may perform functions, such as mobility support, bearer configuration, and Quality of Service (QoS) configuration. The NR CN 105 is a device in charge of various control functions as well as a mobility management function for a terminal, and may be connected to multiple base stations. Further, the next generation mobile communication system may be linked to the existing LTE system, and the NR CN 105 may be connected to a mobile management entity (MME) 125 via a network interface. The MME 125 may be connected to an eNB 130.

Figure 2:
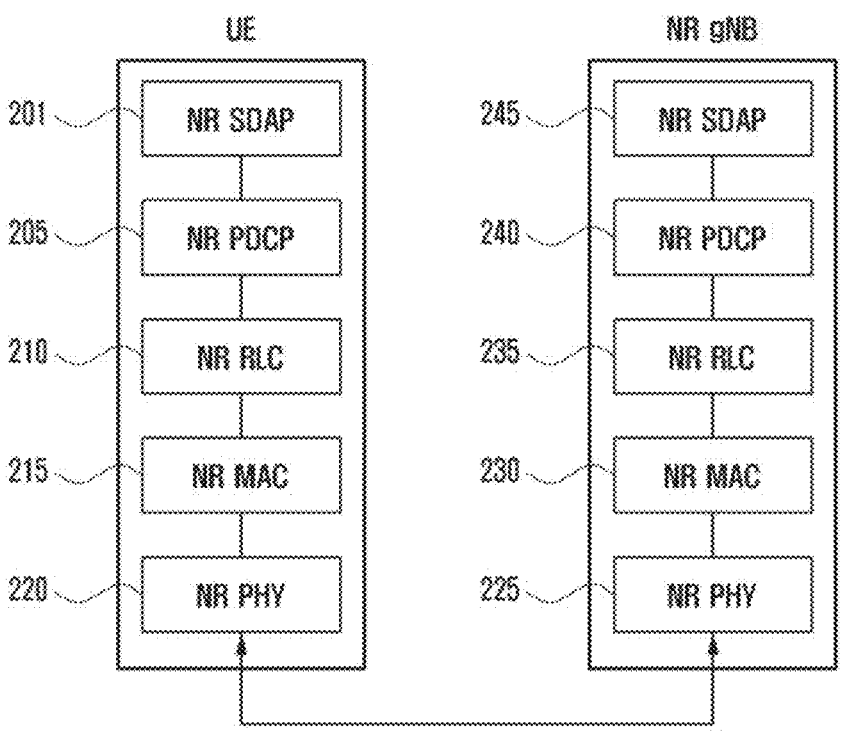
FIG. 2 is a diagram illustrating a radio protocol structure of the next-generation mobile communication system according to an embodiment of the disclosure.

FIG. 2 is a diagram illustrating a radio protocol structure of the next-generation mobile communication system according to an embodiment of the disclosure.

Referring to FIG. 2, a radio protocol of the next-generation mobile communication system includes NR service data adaptation protocols (SDAPs) 201 and 245, NR package data convergence protocols (PDCPs) 205 and 240, NR radio link controls (RLCs) 210 and 235, NR medium access controls (MACs) 215 and 230, and NR PHYs 220 and 225 in a terminal and an NR base station, respectively.

Main functions of the NR SDAPs 201 and 245 may include some of the following functions: a user data transfer function (transfer of user plane data), function of mapping a QoS flow and a data bearer for an uplink and a downlink (mapping between a QoS flow and a data radio bearer (DRB) for both downlink (DL) and uplink (UL)), a function of marking a QoS flow ID in an uplink and a downlink (marking QoS flow ID in both DL and UL packets), and/or a function of mapping reflective QoS flows to data bearers for uplink SDAP protocol data units (PDUs) (reflective QoS flow to DRB mapping for the UL SDAP PDUs)

For an SDAP layer device, the terminal may be configured, via a radio resource control (RRC) message, whether to use a header of the SDAP layer device or use a function of the SDAP layer device for each PDCP layer device, for each bearer, or for each logical channel. When the SDAP header is configured, the terminal may perform indication using an access stratum (AS) QoS reflection configuration 1-bit indicator (AS reflective QoS) and a non-access stratum (NAS) QoS reflection configuration 1-bit indicator (NAS reflective QoS) of the SDAP header, so that the terminal updates or reconfigures mapping information on a QoS flow and a data bearer of uplink and downlink. The SDAP header may include QoS flow ID information indicating a QoS. The QoS information may be used as a data processing priority, scheduling information, etc. to support a smooth service.

Main functions of the NR PDCPs 205 and 240 may include some of the following functions: a header compression and decompression function (header compression and decompression: robust header compression (ROHC) only), a user data transmission function (transfer of user data), a sequential transfer function (in-sequence delivery of upper layer PDUs), a non-sequential transfer function (out-of-sequence delivery of upper layer PDUs), a reordering function (PDCP PDU reordering for reception), a duplicate detection function (duplicate detection of lower layer service data units (SDUs)), a retransmission function (retransmission of PDCP SDUs), an encryption and decryption function (ciphering and deciphering), and/or a timer-based SDU discard function (timer-based SDU discard in uplink).

In the above description, the reordering function of an NR PDCP device may refer to a function of reordering PDCP PDUs, which are received from a lower layer, in order based on a PDCP sequence number (SN). The reordering function of the NR PDCP device may include a function of transferring data to a higher layer in a reordered sequence, may include a function of directly transferring data without considering a sequence, may include a function of reordering and recording lost PDCP PDUs, may include a function of reporting states of the lost PDCP PDUs to a transmission side, and may include a function of requesting retransmission of the lost PDCP PDUs.

Main functions of the NR RLCs 210 and 235 may include some of the following functions: a data transmission function (transfer of upper layer PDUs), a sequential transfer function (in-sequence delivery of upper layer PDUs), a non-sequential transfer function (out-of-sequence delivery of upper layer PDUs), an automatic repeat request (ARQ) function (error correction through ARQ), a concatenation, segmentation, and reassembly function (concatenation, segmentation and reassembly of RLC SDUs), a re-segmentation function (re-segmentation of RLC data PDUs), a reordering function (reordering of RLC data PDUs), a duplicate detection function, an error detection function (protocol error detection), an RLC SDU discard function, and/or an RLC re-establishment function.

In the above description, the in-sequence delivery function of an NR RLC device may refer to a function of sequentially transferring, to a higher layer, RLC SDUs received from a lower layer. When an originally one RLC SDU is divided into multiple RLC SDUs and then received, the in-sequence delivery function of the NR RLC device may include a function of reassembling and then transferring the RLC SDUs.

The in-sequence delivery function of the NR RLC device may include a function of rearranging the received RLC PDUs according to an RLC SN or a PDCP SN, may include a function of reordering and recording lost RLC PDUs, may include a function of reporting states of the lost RLC PDUs to a transmission side, and may include a function of requesting retransmission of lost RLC PDUs.

The in-sequence delivery function of the NR RLC 210 or 235 device may include a function of, when a lost RLC SDU exists, sequentially transferring, to the higher layer, only RLC SDUs before the lost RLC SDU. The in-sequence delivery function of the NR RLC device may include a function of, even if there is a lost RLC SDU, if a predetermined timer expires, sequentially transferring all RLC SDUs, which are received before the timer starts, to the higher layer. In addition, the in-sequence delivery function of the NR RLC device may include a function of, even if there is a lost RLC SDU, if a predetermined timer expires, sequentially transferring all currently received RLC SDUs to the higher layer.

The NR RLC 210 or 235 device may process RLC PDUs in the order of receiving the same regardless of the order of sequence numbers (out of sequence delivery) and may transfer the processed RLC PDUs to the NR PDCP 205 or 240 device.

When the NR RLC 210 or 235 device receives a segment, segments that are stored in a buffer or to be received at a later time are received, reconstructed into one complete RLC PDU, and then transferred to the NR PDCP device.

An NR RLC layer may not include a concatenation function, and the function may be performed in an NR MAC layer or may be replaced with a multiplexing function of the NR MAC layer.

In the above description, the out-of-sequence delivery function of the NR RLC device may refer to a function of directly transferring RLC SDUs, which are received from a lower layer, to a higher layer regardless of order. The out-of-sequence delivery function of the NR RLC device may include a function of, when an originally one RLC SDU is divided into multiple SDUs and then received, reassembling the RLC SDUs and then transferring the same. The out-of-sequence delivery function of the NR RLC device may include a function of storing the RLC SNs or PDCP SNs of the received RLC PDUs, arranging the order, and recording lost RLC PDUs.

The NR MACs 215 and 230 may be connected to multiple NR RLC layer devices included in one terminal, and main functions of the NR MACs may include some of the following functions: a mapping function (mapping between logical channels and transport channels), a multiplexing and demultiplexing function (multiplexing/demultiplexing of MAC SDUs), a scheduling information reporting function, a hybrid ARQ (HARQ) function (error correction through HARQ), a function of priority handling between logical channels (priority handling between logical channels of one UE), a function of priority handling between terminals (priority handling between UEs by means of dynamic scheduling), a MBMS service identification function, a transmission format selection function (transport format selection), and/or padding function.

The NR PHY layers 220 and 225 may perform channel coding and modulation of higher layer data, make the channel coded and modulated higher layer data into OFDM symbols, and transmit the OFDM symbols via a radio channel, or may perform demodulation and channel-decoding of the OFDM symbols received via the radio channel so as to transfer the same to a higher layer.

Figure 3:
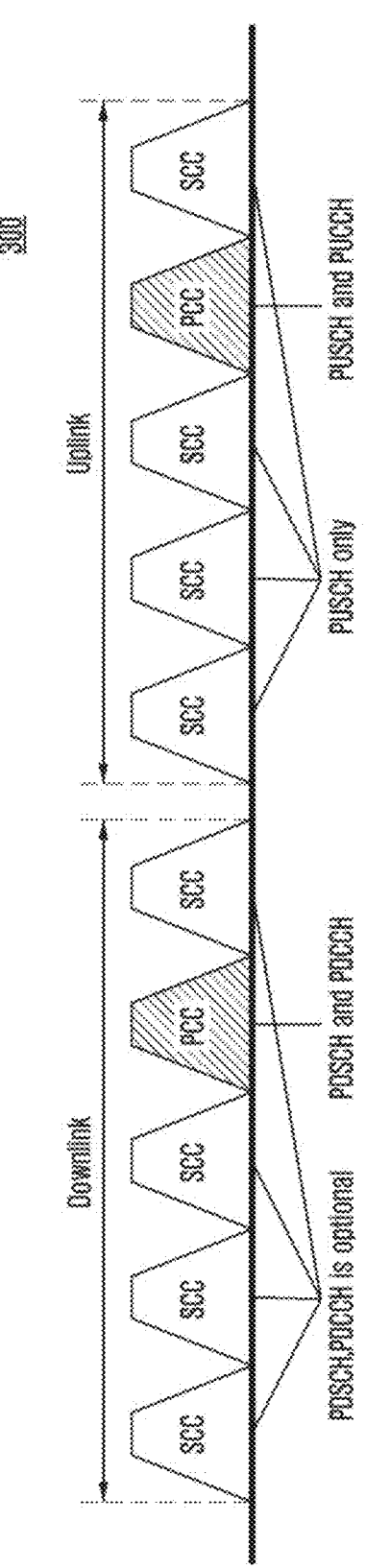
FIG. 3 is a diagram for illustrating carrier aggregation (CA) according to an embodiment of the disclosure.

FIG. 3 is a diagram for illustrating carrier aggregation (CA) according to an embodiment of the disclosure.

Referring to FIG. 3, in reference numeral 300, when CA is configured, a PCell and an SCell may be configured for a terminal.

A PCell may be included in a primary component carrier (PCC), and may provide RRC connection establishment/re-establishment, measurement, a mobility procedure, a random-access procedure and selection, system information acquisition, initial random-access, a security key change, a NAS function, and the like.

Since the terminal performs system information monitoring via a PCell, the PCell is not deactivated, and UL control information transmission is carried on a PCC via a physical uplink control channel (PUCCH) or a physical uplink shared channel (PUSCH). Only one RRC connection is possible between the terminal and the PCell, and PDCCH/PDSCH/PUSCH/PUCCH transmission is possible. In a secondary cell group, a PSCell may be configured so as to be operated as the PCell. Operations for a PCell described below may also be performed by a PSCell.

Up to 31 SCells can be added, and when an additional radio resource needs to be provided, an SCell may be configured via an RRC message (e.g., dedicated signaling). The RRC message may include a physical cell ID for each cell, and a DL carrier frequency (absolute radio frequency channel number (ARFCN)) may be included. PDCCH/PDSCH/PUSCH transmission is possible via the SCell. Via a MAC layer, for battery conservation of a UE, dynamic activation and deactivation procedures of the SCell are supported.

Cross-carrier scheduling may refer to allocating, to one component carrier (CC), at least one (e.g., a PDCCH) of all L1 control channels or L2 control channels for at least one other component carrier (CC). A carrier indicator field (CIF) may be used to transmit data scheduling information of another CC via a PDCCH of one CC.

Resources (a PDSCH and a PUSCH) for data transmission of the CC or resources (a PDSCH and a PUSCH) for data transmission of another CC may be allocated based on downlink control information (DCI) transmitted via the PDCCH of one CC.

Figure 4:
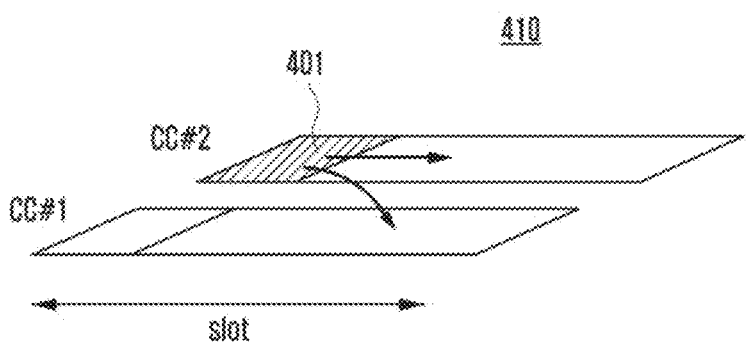
FIG. 4 is a diagram illustrating an example of a cross-carrier scheduling method according to an embodiment of the disclosure.
Figure 4:
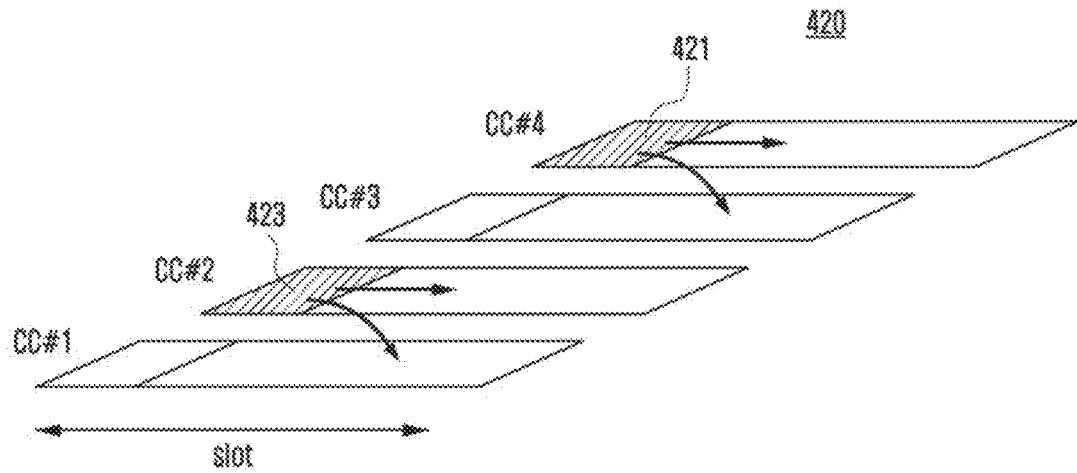
Figure 4:
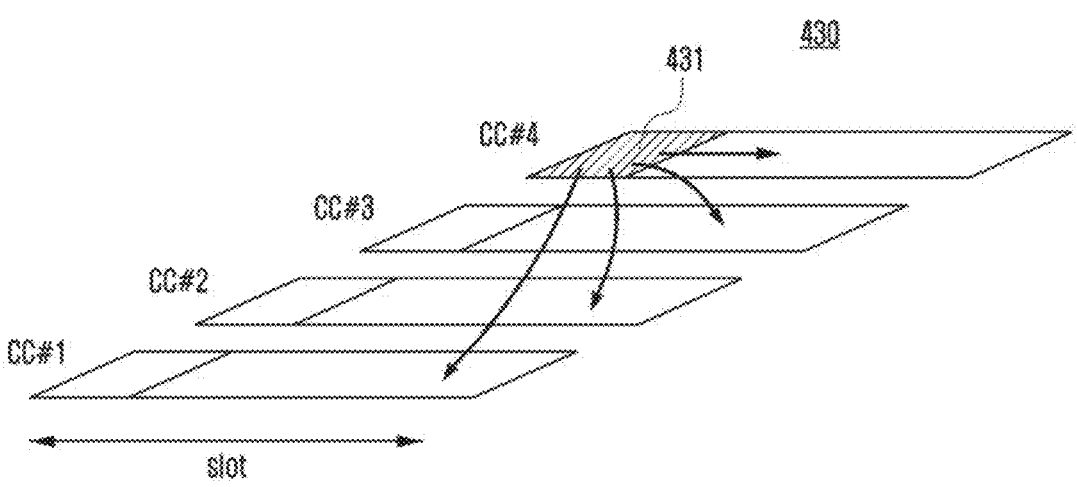

FIG. 4 is a diagram illustrating an example of a cross-carrier scheduling method according to an embodiment of the disclosure.

Referring to reference numeral 410 of FIG. 4, PDSCHs or PUSCHs for two CCs may be scheduled via a PDCCH 401 of one CC.

Referring to reference numeral 420 of FIG. 4, when a total of four CCs are configured, the PDSCHs or PUSCHs of the respective CCs may be scheduled using PDCCHs 421 and 423 of the two CCs.

Referring to reference numeral 430 of FIG. 4, when a total of four CCs are configured, the PDSCHs or PUSCHs of the respective CCs may be scheduled using a PDCCH 423 of one CC.

The respective CCs may be mapped to carrier indicator (CI) values for CIF application, and this may be transmitted as a UE-specific configuration from a base station to a terminal via a dedicated RRC signal.

Each PDSCH/PUSCH CC may be scheduled from one DL CC. Accordingly, the UE may monitor the PDCCH only on the DL CC in order to acquire PDSCH or PUSCH scheduling information for each PDSCH/PUSCH CC. The terminal may monitor the PDCCH in the DL CC to acquire PDSCH or PUSCH scheduling information in a linked carrier.

DSS enables cells of LTE and new radio access technology (RAT) to coexist in the same carrier, so as to provide an option for a communication service provider to switch to an NR communication system while maintaining the existing LTE communication system.

As the number of NR terminals in a network increases, the lack of scheduling capacity for NR terminals may occur. Hereinafter, a specific method of scheduling PDSCHs or PUSCHs of multiple cells via a PDCCH of one cell is disclosed. A cell that schedules PDSCHs or PUSCHs of multiple cells may be referred to as a "scheduling cell" in the disclosure.

According to an embodiment of the disclosure, a scheduling cell and a cell transmitting an RRC message may match. According to another example, a scheduling cell and a cell transmitting an RRC message may not match. A cell transmitting an RRC message may transmit the RRC message including information on a scheduling cell. Table 1 below shows, as an example, CrossCarrierSchedulingConfig including information on a scheduling cell among information included in an RRC message.

TABLE 1

CrossCarrierSchedulingConfig

The IE CrossCarrierSchedulingConfig is used to specify the configuration when the cross-carrier scheduling is used in a cell.

CrossCarrierSchedulingConfig information element

```
-- ASN1START
-- TAG-CrossCarrierSchedulingConfig-START
CrosCarrierSchedulingConfig ::=      SEQUENCE {
    schedulingCellInfo                 CHOICE {
        own                              SEQUENCE {      --
Cross carrier scheduling: scheduling cell
            cif-Presence                 BOOLEAN
        },
        other                          SEQUENCE {      --
Cross carrier scheduling: scheduled cell
            schedulingCellId             ServCellIndex,
            cif-InSchedulingCell         INTEGER (1 . . 7)
        }
    },
    . . .
}
-- TAG-CrossCarrierSchedulingConfig-STOP
-- ASN1STOP
```

CrossCarrierSchedulingConfig field descriptions cif-Presence
The field is used to indicate whether carrier indicator field is present (value true) or not (value false) in PDCCH DCI formats, see TS 38.213 [13]. If cif-Presence is set to true, the CIF value indicating a grant or assignment for this cell is 0.
cif-InSchedulingCell
The field indicates the CIF value used in the scheduling cell to indicate a grant or assignment applicable for this cell, see TS 38.213 [13].
other
Parameters for cross-carrier scheduling, i.e., a serving cell is scheduled by a PDCCH on another (scheduling) cell. The network configures this field is only for SCells.
own
Parameters for self-scheduling, i.e., a serving cell is scheduled by its own PDDCH.
schedulingCellId
Indicates which cell signals the downlink allocations and upling grants, if applicable, for the concerned SCell. In case the UE is configured with DC, the scheduling cell is part of the same cell group (i.e. MCG or SCG) as the scheduled cell.

Referring to Table 1, CrossCarrierSchedulingConfig may include schedulingCellId. schedulingCellId may indicate an index of a cell that schedules PDSCHs of multiple cells. The terminal may identify the scheduling cell by identifying schedulingCellId of CrossCarrierSchedulingConfig, and may identify the scheduled PDSCHs of the multiple cells by identifying DCI transmitted by the scheduling cell.

Hereinafter, described are various embodiments of using DCI for scheduling PDSCHs of multiple cells.

Figure 5:
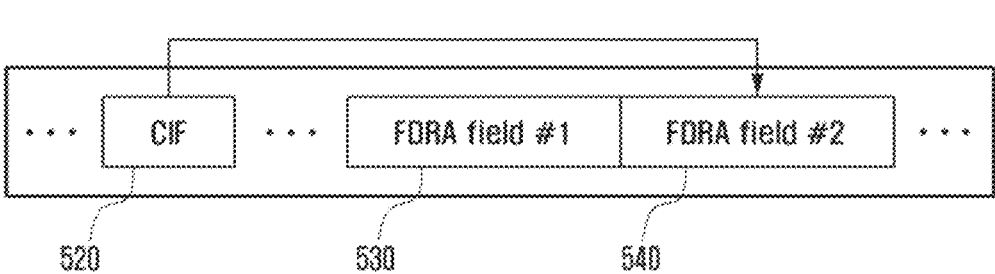
FIG. 5 is a diagram illustrating a format of downlink control information (DCI) according to an embodiment the disclosure.

FIG. 5 is a diagram illustrating a format of DCI according to an embodiment the disclosure.

Referring to FIG. 5, DCI 510 may include one CIF 520 and two frequency domain resource assignment (FDRA) fields 530 and 540.

A base station may configure information on the number of FDRAs by using a variable (e.g., FDRAadd). For example, if the maximum number of FDRAs allocable by the base station is two, the variable may be configured to a Boolean type, and if the maximum number of allocable FDRAs is three or more, the variable may be configured to an integer type.

The base station may transmit the variable indicating information on the number of FDRAs to the terminal via an RRC message. The information transmitted to the terminal via the RRC message may include at least some of Cell-GroupConfig information element (IE), ServingCellConfig IE, ServingCellConfig IE, and PDCCH-Config IE. If the base station adds the variable to CellGroupConfig IE, this may be applied to all serving cells belonging to a specific CellGroup. If the base station adds the variable to Serving-CellConfig IE, this may be applied to a corresponding serving cell. If the base station adds the variable to PDCCH-Config IE, this may be applied to a specific bandwidth part (BWP). Alternatively, if the base station adds the variable to a scheduling cell part of CrossCarrierSchedulingConfig IE, this may be applied to a scheduling cell.

The base station may transmit information on a DCI format (e.g., DCI format 1-1 or DCI format 1-2) to the terminal via the RRC message so that the terminal monitors DCI including scheduling information for PDSCHs of multiple cells. The DCI may be transmitted via a PDCCH of the scheduling cell.

The base station may configure one CIF and two FDRAs in the DCI format monitored by the terminal, by using CrossCarrierSchedulingConfig IE and the variable indicating information on the number of FDRAs.

Referring to FIG. 5, FDRA field #1 530 may be an FDRA allocated to a PDSCH transmitted in a scheduling cell that transmits DCI 510. FDRA field #2 540 may be an FDRA allocated to a PDSCH transmitted in a cell other than the scheduling cell. The cell other than the scheduling cell may be indicated by a CIF 520.

In FIG. 5, FDRA field #1 530 is located first and FDRA field #2 540 is located later, but the order thereof may be changed.

In FIG. 5, FDRA field #1 530 and FDRA field #2 540 are indicated to be located continuously, but the two FDRA fields may be located discontinuously. For example, information on the PDSCH transmitted in the scheduling cell (e.g., time domain resource assignment, virtual resource block (VRB)-to-physical resource block (PRB) mapping, an HARQ process number, etc.) may be first arranged, and information on the PDSCH transmitted in a cell other than the scheduling cell may be arranged later.

Figure 6:
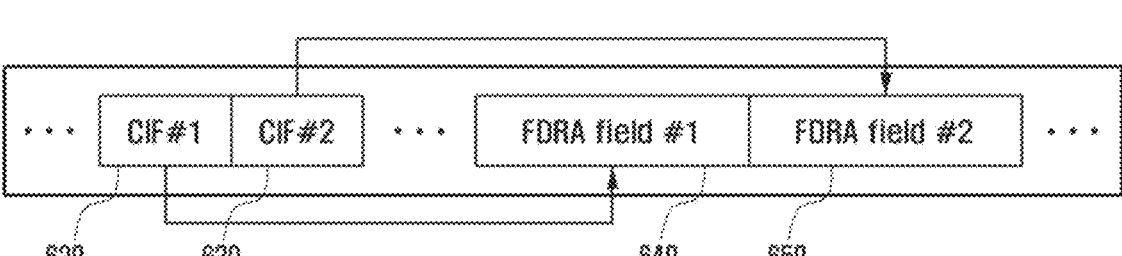
FIG. 6 is a diagram illustrating a format of DCI according to an embodiment of the disclosure.

FIG. 6 is a diagram illustrating a format of DCI according to an embodiment of the disclosure.

Referring to FIG. 6, DCI 610 may include two CIFs 620 and 630 and two FDRAs 640 and 650.

A base station may configure the number of CIFs and FDRAs included in DCI monitored by a terminal. The base station may transmit information on the number of configured CIFs and FDRAs, to the terminal via an RRC message. The base station may transmit, to the terminal via the RRC message, that the number of CIFs and FDRAs included in the DCI 610 is two.

Table 2 below shows CrossCarrierSchedulingConfig IE modified to indicate the number of CIFs and FDRAs according to an embodiment of the disclosure.

TABLE 2

| CrossCarrierSchedulingConfig |
|---|
| The IE CrossCarrierSchedulingConfig is used to specify the configuration when the cross-carrier scheduling is used in a cell. |

| CrossCarrierSchedulingConfig information element |
|---|
| -- ASN1START<br>-- TAG-CrossCarrierSchedulingConfig-START<br>CrosCarrierSchedulingConfig ::=     SEQUENCE {<br>   schedulingCellInfo           CHOICE {<br>     own               SEQUENCE {     --<br>Cross carrier scheduling: scheduling cell<br>       number-of-cif          INTEGER (1 .. 2)<br>    },<br> . . .<br>}<br>-- TAG-CrossCarrierSchedulingConfig-STOP<br>-- ASN1STOP |

| CrossCarrierSchedulingConfig field descriptions |
|---|
| number-of-cif<br>The field is used to indicate number of fields in PPDCCH DCI formats, see TS 38.213 [13]. If the value is equal or greather than 1, the CIF value indicating a grant or assignment for this cell is 0. |

Referring to Table 2, a number-of-cif field may be added. The number-of-cif field may indicate the number of CIFs in a PDCCH of DCI. For example, if a value of the number-of-cif field is 1, this may indicate that the number of CIFs and FDRAs is 1, and if the value of the number-of-cif field is 2, this may indicate that the number of CIFs and FDRAs may be 2. The terminal may identify the number of CIFs and FDRAs included in DCI by identifying the value of the number-of-cif field.

Referring to FIG. 6, CIFs 620 and 630 may have corresponding FDRAs 640 and 650, respectively. Frequency resource information for a PDSCH transmitted in a cell indicated by CIF #1 620 may be indicated by FDRA field #1 640. Frequency resource information for a PDSCH transmitted in a cell indicated by CIF #2 630 may be indicated by FDRA field #2 650.

In FIG. 6, FDRA field #1 640 and FDRA field #2 650 are indicated to be located continuously, but the two FDRA fields may be located discontinuously. For example, information (e.g., time domain resource assignment, VRB-to-PRB mapping, an HARQ process number, etc.) on the PDSCH transmitted in the cell indicated by CIF #1 620 is first arranged, and information on the PDSCH transmitted in the cell indicated by CIF #2 630 may be arranged later.

In the embodiment, described in FIG. 5, of using one CIF and two FDRAs, DCI overhead may be reduced, but scheduling may be restrictive. On the other hand, in the embodiment, described in FIG. 6, of using two CIFs and two FDRAs, DCI overhead may be increased, but scheduling may be flexible.

Figure 7:
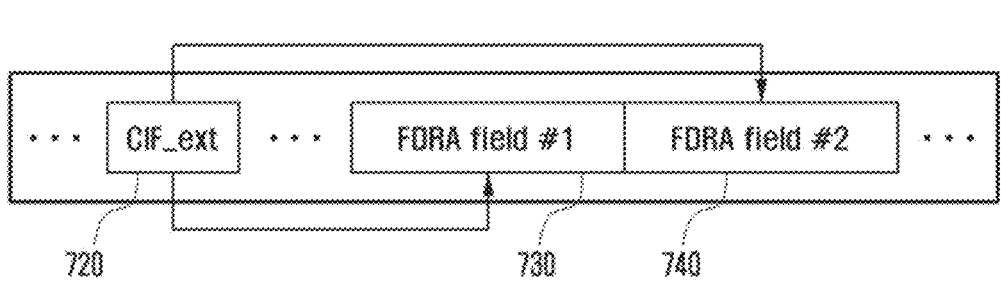
FIG. 7 is a diagram illustrating a format of DCI according to an embodiment of the disclosure.

FIG. 7 is a diagram illustrating a format of DCI according to an embodiment of the disclosure.

Referring to FIG. 7, DCI 710 may include one extended CIF 720 and two FDRAs 730 and 740. The extended CIF 720 may indicate multiple combinations of serving cells existing in a cell group (CellGroup). That is, a value indicated by the extended CIF 720 may be one of the multiple combinations of serving cells.

Table 3 below shows the extended CIF according to an embodiment of the disclosure.

TABLE 3

|  |  | ServingCell$_2$ |  |  |  |  |  |  |  |
|---|---|---|---|---|---|---|---|---|---|
|  |  | 0 | 1 | 2 | 3 | 4 | 5 | 6 | 7 |
| ServingCell$_1$ | 0 | — | 00000 | 00001 | 00010 | 00011 | 00100 | 00101 | 00110 |
|  | 1 | — | — | 00111 | 01000 | 01001 | 01010 | 01011 | 01100 |
|  | 2 | — | — | — | 01101 | 01110 | 01111 | 10000 | 10001 |
|  | 3 | — | — | — | — | 10010 | 10011 | 10100 | 10101 |
|  | 4 | — | — | — | — | — | 10110 | 10111 | 11000 |
|  | 5 | — | — | — | — | — | — | 11001 | 11010 |
|  | 6 | — | — | — | — | — | — | — | 11011 |
|  | 7 | — | — | — | — | — | — | — | — |

Referring to Table 3, a total of 8 cells may be included in a cell group. Table 3 shows an extended CIF of a case of 2 serving cells among 8 cells. For example, if the extended CIF is "10011", serving cell 1 (ServingCell$_1$) may indicate a cell having an index of 3, and serving cell 2 (ServingCell$_2$) may indicate a cell having an index of 5.

As described in Table 3, a value expressed by the extended CIF is a combination that may be obtained when two cells in the cell group are selected as serving cells, and may be expressed as (ServingCell$_1$, ServingCell$_2$). Indices of cells indicated by (ServingCell$_1$, ServingCell$_2$) may be arranged in a specific order. For example, a cell having a small index may be located at the front (ServingCell$_1$), and a cell having a large index may be located at the back (ServingCell$_2$). As another example, a cell having a large index may be located at the front (ServingCell$_1$), and a cell having a small index may be located at the back (ServingCell$_2$).

A value that is not indicated by Table 3 may be reserved for future use or may be used for a special purpose.

The indexing method as shown in Table 3 or information related to Table 3 may be transferred to the terminal via an RRC message. The indexing method or the information related to Table 3 may be stored in an inactive memory when the terminal and the base station are manufactured.

Referring back to FIG. 7, the base station may schedule PDSCHs of multiple cells indicated by the extended CIF 720. Based on (ServingCell$_1$, ServingCell$_2$) indicated by a combination of selected cells, FDRAs allocated to the PDSCHs of the respective cells may be represented by FDRA field #1 730 and FDRA field #2 740.

The base station may configure a CIF included in DCI monitored by the terminal via an RRC message. The base station may determine a size of the CIF as needed and/or according to whether the terminal supports the same. For example, the base station may configure a variable indicating whether the CIF is an extended CIF or may configure the size (e.g., the number of bits) of the CIF so as to transmit the same to the terminal. The terminal may determine whether the CIF is an extended CIF via the RRC message received from the base station. The terminal may also determine the size of the CIF in a case of an extended CIF.

Figure 8:
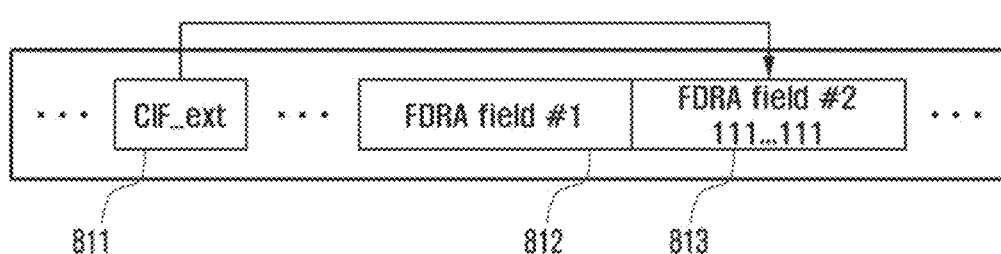
FIG. 8 is a diagram illustrating a format of DCI according to an embodiment of the disclosure.
Figure 8:
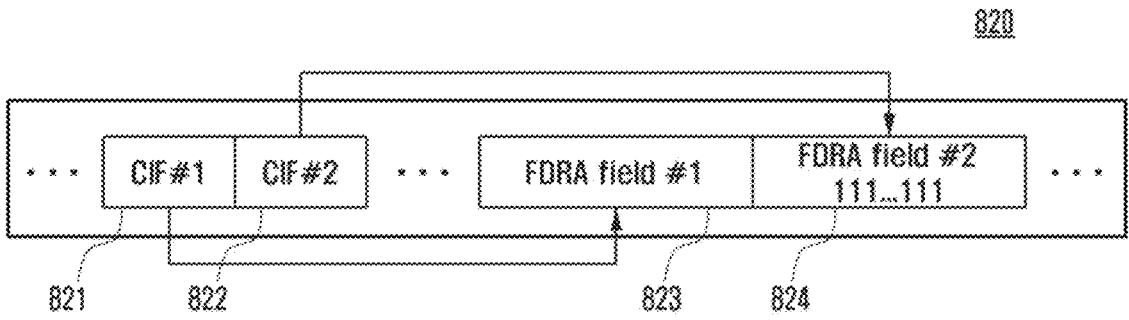

FIG. 8 is a diagram illustrating a format of DCI according to an embodiment of the disclosure.

FIG. 5 to FIG. 7 describe the methods by which a scheduling cell schedules PDSCHs of multiple cells, while FIG. 8 describes an embodiment in which PDSCHs of some cells among multiple cells are not scheduled using DCI for scheduling of PDSCHs of the multiple cells.

Referring to reference numeral 810 of FIG. 8, an extended CIF 811 may indicate multiple cells. For example, the extended CIF 811 may indicate two cells, one of the cells may transmit data via a PDSCH, and the other cell may not transmit data. Frequency resource information for the PDSCH of the cell for transmitting of data may be indicated in FDRA field #1 812, and FDRA field #2 813 may be filled with a predesignated value to indicate the absence of frequency resource information for a PDSCH. For example, a value of FDRA field #2 813 may be filled with a value that does not indicate resource allocation. For example, all bits of FDRA field #2 813 may be filled with "1". The terminal may check the DCI 810 so as to identify that there is no frequency resource allocated to a PDSCH in one cell.

Referring to reference numeral 820 of FIG. 8, multiple CIFs 821 and 822 and multiple FDRAs may be included in DCI 820. Frequency resource information for a PDSCH transmitted in a cell indicated by CIF #1 821 may be indicated by FDRA field #1 823. Frequency resource information for a PDSCH transmitted in a cell indicated by CIF #2 822 may be indicated by FDRA field #2 824. For example, when there is no frequency resource information of a PDSCH transmitted in the cell indicated by CIF #2 822, FDRA field #2 824 may be filled with a predesignated value. For example, a value of FDRA field #2 813 may be filled with a value that does not indicate resource allocation. For example, all bits of FDRA field #2 813 may be filled with "1". The predesignated value indicating that there is no frequency resource information for a PDSCH may be changed based on configuration.

Figure 9:
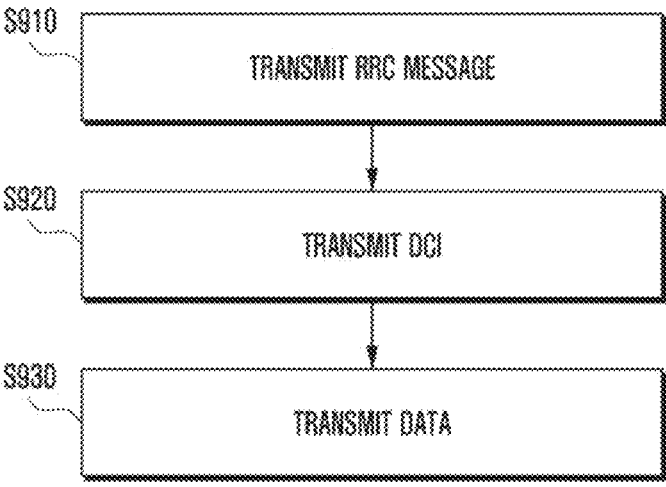
FIG. 9 is a diagram illustrating a method of scheduling physical downlink shared channels (PDSCHs) of multiple cells for a terminal by a base station, according to an embodiment of the disclosure.

FIG. 9 is a diagram illustrating a method of scheduling PDSCHs of multiple cells for a terminal by a base station, according to an embodiment of the disclosure.

Referring to FIG. 9, a base station may schedule PDSCHs of multiple cells for a terminal via one piece of DCI.

The base station may transmit an RRC message to the terminal in operation S910. The RRC message may include information on a scheduling cell of the terminal and information (e.g., DCI format 1_1) on a format of DCI to be received by the terminal.

The base station may transmit DCI to the terminal in operation S920. The DCI may include frequency domain resource assignment (FDRA) information for the PDSCHs of the multiple cells. The DCI may include indices of the multiple cells and frequency domain resource assignment information (or frequency domain resource allocation information) for PDSCHs corresponding thereto. The DCI may include information indicating an index combination of the multiple cells and frequency domain resource assignment information for PDSCHs corresponding thereto. If a cell that schedules no PDSCH is included in the multiple cells, the DCI may indicate a predesignated value for the frequency domain resource assignment information for the PDSCHs.

The base station may transmit data to the terminal via the multiple cells, based on the DCI in operation S930.

Figure 10:
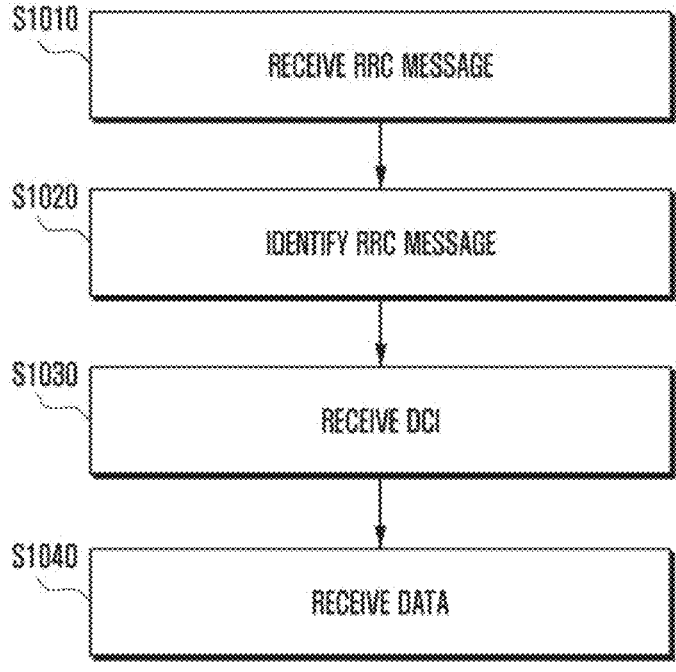
FIG. 10 is a diagram illustrating a method of receiving data by a terminal via PDSCHs of multiple cells, according to an embodiment of the disclosure.

FIG. 10 is a diagram illustrating a method of receiving data by a terminal via PDSCHs of multiple cells, according to an embodiment of the disclosure.

Referring to FIG. 10, a terminal may receive data via PDSCHs of multiple cells indicated by one piece of DCI.

The terminal may receive an RRC message from a base station in operation S1010. The RRC message may include information on a scheduling cell of the terminal and information on a format of DCI to be received by the terminal. The RRC message may further include at least one of the number of cell indices included in the DCI, whether cell index combination information is included, and the number of pieces of frequency domain resource assignment information for the PDSCH.

In operation S1020, the terminal may identify information on the scheduling cell and information on a format of DCI by using the received RRC message.

In operation S1030, the terminal may receive DCI, based on the identified format of DCI. The DCI may include frequency domain resource assignment information for PDSCHs of the multiple cells. The DCI may include indices of the multiple cells and frequency domain resource assignment information for PDSCHs corresponding thereto. The DCI may include information indicating an index combination of the multiple cells and frequency domain resource assignment information for PDSCHs corresponding thereto. If a cell that schedules no PDSCH is included in the multiple cells, the DCI may indicate a predesignated value for the frequency domain resource assignment information for the PDSCHs.

In operation S1040, the terminal may receive data via the multiple cells, based on the DCI.

Figure 11:
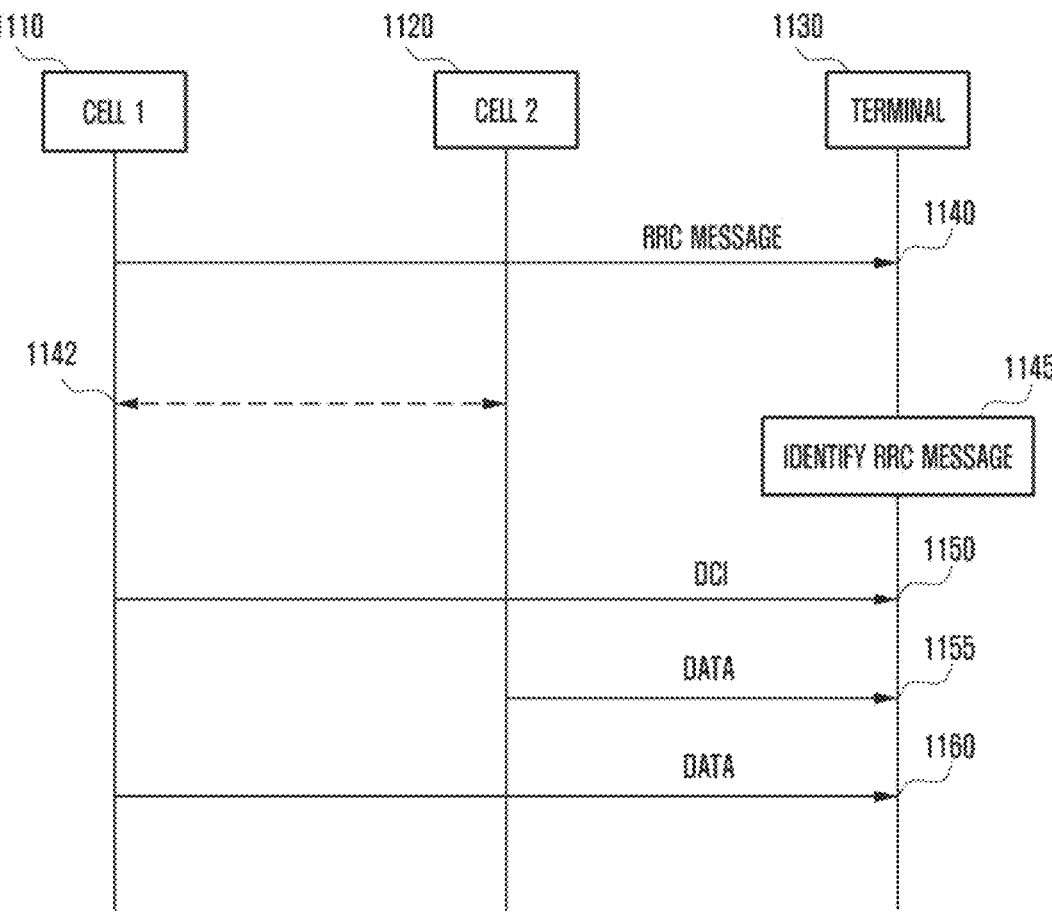
FIG. 11 is a diagram illustrating a flowchart of scheduling PDSCHs of multiple cells for a terminal by a cell, according to an embodiment of the disclosure.

FIG. 11 is a diagram illustrating a flowchart of scheduling PDSCHs of multiple cells for a terminal by a cell, according to an embodiment of the disclosure. One base station may operate at least one cell.

According to an embodiment of the disclosure, a cell for transmitting of an RRC message to a terminal and a cell that schedules PDSCHs of multiple cells may be the same. In FIG. 11, cell 1 1110 may schedule a PDSCH as well as transmit an RRC message to a terminal 1130.

In operation 1140, cell 1 1110 may transmit an RRC message to the terminal 1130. The RRC message may include information on the scheduling cell and information on a format of DCI to be received. In FIG. 11, the information on the scheduling cell may be information on cell 1 1110.

In operation 1142, cell 1 1110 may negotiate, with cell 2 1120, for a PDSCH to be scheduled for the terminal 1130.

In operation 1145, the terminal 1130 may identify, via the received RRC message, information on the scheduling cell and information on the format of DCI to be received.

In operation 1150, cell 1 1110, as the scheduling cell, may transmit the DCI to the terminal 1130.

In operations 1155 and 1160, the terminal 1130 may receive data from cell 1 1110 and cell 2 1120, based on the DCI.

Figure 12:
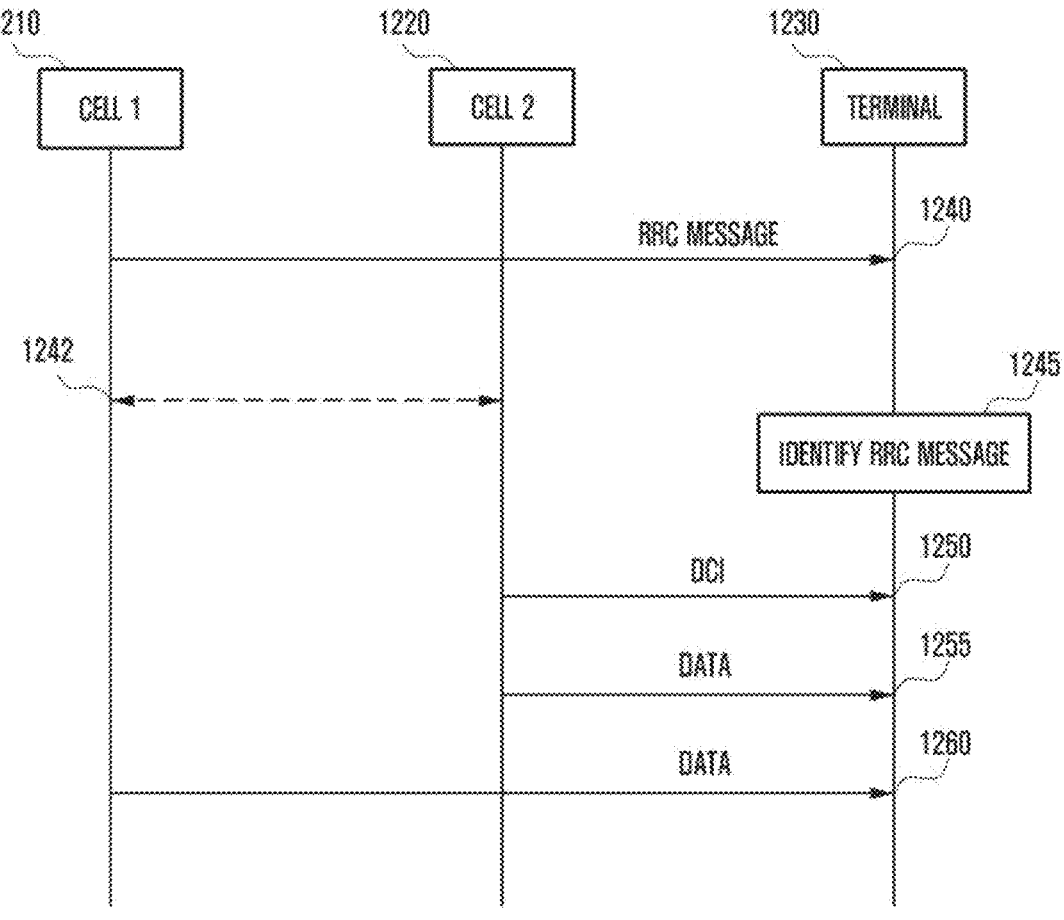
FIG. 12 is a diagram illustrating a flowchart of scheduling PDSCHs of multiple cells for a terminal by a cell, according to an embodiment of the disclosure.

FIG. 12 is a diagram illustrating a flowchart of scheduling PDSCHs of multiple cells for a terminal by a cell, according to an embodiment of the disclosure. One base station may operate at least one cell.

According to an embodiment of the disclosure, a cell for transmitting of an RRC message to a terminal and a cell that schedules PDSCHs of multiple cells may be different. In FIG. 12, cell 1 1210 may transmit an RRC message to a terminal 1230, and cell 2 1220 may schedule PDSCHs of multiple cells for the terminal 1230.

In operation 1240, cell 1 1210 may transmit an RRC message to the terminal 1230. The RRC message may include information on the scheduling cell and information on a format of DCI to be received. In FIG. 12, the information on the scheduling cell may be information on cell 2 1220.

In operation 1242, cell 2 1220 may negotiate, with cell 1 1210, for a PDSCH to be scheduled for the terminal 1230.

In operation 1245, the terminal 1230 may identify, via the received RRC message, information on the scheduling cell and information on the format of DCI to be received.

In operation 1250, cell 2 1220, as the scheduling cell, may transmit the DCI to the terminal 1230.

In operations 1255 and 1260, the terminal 1230 may receive data from cell 1 1210 and cell 2 1220, based on the DCI.

Figure 13:
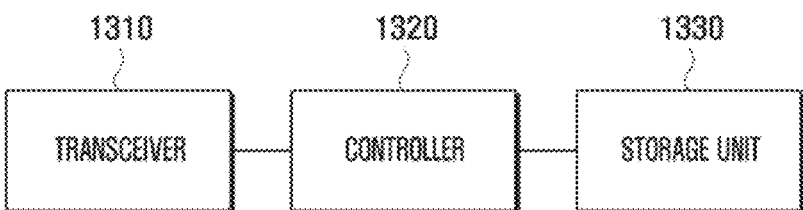
FIG. 13 is a diagram illustrating a structure of a base station according to an embodiment of the disclosure.

FIG. 13 is a diagram illustrating a structure of a base station according to an embodiment of the disclosure.

Referring to FIG. 13, a base station may include a transceiver 1310, a controller 1320, and a storage unit 1330. In the disclosure, the controller 1320 may be defined as a circuit, an application-specific integrated circuit, or at least one processor (e.g., including processing circuitry). The transceiver 1310 may be defined as a circuit, a communication circuit.

The transceiver 1310 may transmit a signal to or receive a signal from another network entity. The transceiver 1310 may transmit DCI to a terminal via, for example, a scheduling cell of the terminal. The transceiver 1310 may transmit an RRC message to a terminal. The transceiver 1310 may receive data from a terminal and may transmit data to the terminal.

The controller 1320 may control overall operations of the base station according to the embodiment proposed in the disclosure. For example, the controller 1320 may control signal flows between respective blocks to perform operations according to the above-described flowchart. For example, the controller 1320 may transmit data via multiple cells, based on the DCI according to an embodiment of the disclosure. The DCI may include frequency domain resource assignment information (FDRA) for PDSCHs of the multiple cells. The DCI may include indices of the multiple cells and FDRA for the PDSCHs corresponding to the multiple cells. The DCI may include information indicating an index combination of the multiple cells and FDRA for PDSCHs corresponding thereto. If a cell that schedules no PDSCH is included in the multiple cells, the DCI may indicate a predesignated value for the FDRA for the PDSCHs. The controller 1320 may further transmit the RRC message including information on the scheduling cell and information on a format of the DCI to be received by the terminal.

The storage unit 1330 may store at least one of information transmitted or received via the transceiver 1310 and information generated via the controller 1320.

Figure 14:
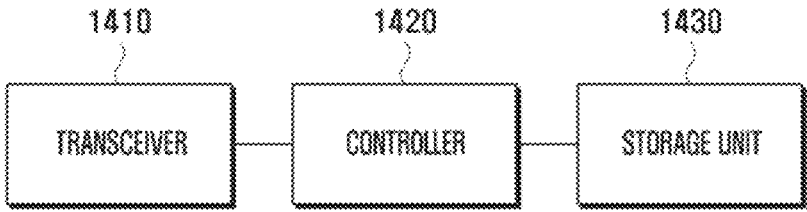
FIG. 14 is a diagram illustrating a structure of a terminal according to an embodiment of the disclosure.

FIG. 14 is a diagram illustrating a structure of a terminal according to an embodiment of the disclosure.

Referring to FIG. 14, a terminal may include a transceiver 1410, a controller 1420, and a storage unit 1430. In the disclosure, the controller 1420 may be defined as a circuit, an application-specific integrated circuit, or at least one processor (e.g., including processing circuitry). The transceiver 1410 may be defined as a circuit, a communication circuit.

The transceiver 1410 may transmit a signal to or receive a signal from another network entity. The transceiver 1410 may receive, for example, an RRC message from a base station. The transceiver 1410 may also receive DCI from a base station.

The controller 1420 may control overall operations of the terminal according to the embodiment proposed in the disclosure. For example, the controller 1420 may control signal flows between respective blocks to perform operations according to the above-described flowchart. For example, according to an embodiment of the disclosure, the controller 1420 may identify, from the RRC message received via the transceiver 1410, information on a scheduling cell and information on a format of DCI to be received, and may receive DCI according to the identified format from the scheduling cell. The controller 1420 may receive data via multiple cells, based on the DCI. The DCI may include frequency domain resource assignment information (FDRA) for PDSCHs of the multiple cells. The DCI may include indices of the multiple cells and frequency domain resource assignment information for PDSCHs corresponding thereto. The DCI may include information indicating an index combination of the multiple cells and frequency domain resource assignment information for PDSCHs corresponding thereto. If a cell that schedules no PDSCH is included in the multiple cells, the DCI may indicate a predesignated value for the frequency domain resource assignment information for the PDSCHs. The RRC message may include at least one of the number of cell indices included in the DCI, whether cell indices correspond to an index combination, and the number of pieces of frequency domain resource assignment information for the PDSCH.

The storage unit 1430 may store at least one of information transmitted or received via the transceiver 1410 and information generated via the controller 1420.

According to various embodiments of the disclosure, a method of a terminal in a wireless communication system may include receiving a RRC message, identifying, from the received RRC message, information on a scheduling cell and information on a format for DCI to be received, receiving, from the scheduling cell, the DCI according to the identified format, and receiving, based on the DCI, data via multiple cells, wherein the DCI includes frequency domain resource assignment information for PDSCHs of the multiple cells.

In the method of the terminal according to various embodiments of the disclosure, the DCI may include indices of the multiple cells and frequency domain resource assignment information for PDSCHs corresponding thereto.

In the method of the terminal according to various embodiments of the disclosure, the DCI may include information indicating an index combination of the multiple cells and frequency domain resource assignment information for PDSCHs corresponding thereto.

In the method of the terminal according to various embodiments of the disclosure, if a cell that schedules no PDSCH is included in the multiple cells, the DCI may indicate a predesignated value for the frequency domain resource assignment information for the PDSCHs.

In the method of the terminal according to various embodiments of the disclosure, the RRC message may further include at least one of the number of pieces of the frequency domain resource assignment information for the PDSCHs, whether cell index combination information is included, and the number of cell indices included in the DCI.

According to various embodiments of the disclosure, a method of a base station in a wireless communication system may include transmitting DCI to a terminal via a scheduling cell of the terminal, and transmitting data via multiple cells, based on the DCI, wherein the DCI includes frequency domain resource assignment information for PDSCHs of the multiple cells.

The method of the base station according to various embodiments of the disclosure may further include transmitting a RRC message including information on a format of the DCI to be received by the terminal and information on the scheduling cell.

In the method of the base station according to various embodiments of the disclosure, the DCI may include indices of the multiple cells and frequency domain resource assignment information for PDSCHs corresponding thereto.

In the method of the base station according to various embodiments of the disclosure, the DCI may include information indicating an index combination of the multiple cells and frequency domain resource assignment information for PDSCHs corresponding thereto.

In the method of the base station according to various embodiments of the disclosure, if a cell that schedules no PDSCH is included in the multiple cells, the DCI may indicate a predesignated value for the frequency domain resource assignment information for the PDSCHs.

According to various embodiments of the disclosure, a terminal in a wireless communication system may include a transceiver, and a controller configured to receive a RRC message via the transceiver, identify, from the received RRC message, information on a scheduling cell and information on a format for DCI to be received, receive, from the scheduling cell, the DCI according to the identified format, and receive, based on the DCI, data via multiple cells, wherein the DCI includes frequency domain resource assignment information for PDSCHs of the multiple cells.

In the terminal according to various embodiments of the disclosure, the DCI may include indices of the multiple cells and frequency domain resource assignment information for PDSCHs corresponding thereto.

In the terminal according to various embodiments of the disclosure, the DCI may include information indicating an index combination of the multiple cells and frequency domain resource assignment information for PDSCHs corresponding thereto.

In the terminal according to various embodiments of the disclosure, if a cell that schedules no PDSCH is included in the multiple cells, the DCI may indicate a predesignated value for the frequency domain resource assignment information for the PDSCHs.

In the terminal according to various embodiments of the disclosure, the RRC message may further include at least one of the number of pieces of the frequency domain resource assignment information for the PDSCHs, whether cell index combination information is included, and the number of cell indices included in the DCI.

According to various embodiments of the disclosure, a base station in a wireless communication system may include a transceiver, and a controller configured to transmit DCI to a terminal by using the transceiver via a scheduling cell of the terminal, and transmit data via multiple cells, based on the DCI, wherein the DCI includes frequency domain resource assignment information for PDSCHs of the multiple cells.

The controller of the base station according to various embodiments of the disclosure may further transmit a radio resource control (RRC) message including information on a format of the DCI to be received by the terminal and information on the scheduling cell.

In the base station according to various embodiments of the disclosure, the DCI may include indices of the multiple cells and frequency domain resource assignment information for PDSCHs corresponding thereto.

In the base station according to various embodiments of the disclosure, the DCI may include information indicating an index combination of the multiple cells and frequency domain resource assignment information for PDSCHs corresponding thereto.

In the base station according to various embodiments of the disclosure, if a cell that schedules no PDSCH is included in the multiple cells, the DCI may indicate a predesignated value for the frequency domain resource assignment information for the PDSCHs.

In the above, descriptions have been provided by taking an example in which a scheduling cell is for scheduling of PDSCHs of multiple cells, but the scheduling cell may also be applied to PUSCH scheduling.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In addition, in the methods of the disclosure, some or all of the contents of each embodiment may be implemented in combination without departing from the essential features of the disclosure.

While the disclosure has been particularly shown and described with reference to embodiments thereof, it will be understood that various changes in form and details may be made therein without departing from the spirit and scope of the following claims.

What is claimed is:

1. A method of a terminal in a wireless communication system, the method comprising:
   receiving a radio resource control (RRC) message;
   identifying, from the RRC message, information on a scheduling cell and a format for downlink control information (DCI) to be received and information related to a number of cells to be scheduled via the DCI;
   receiving a DCI having the identified format; and
   receiving a physical downlink shared channel (PDSCH) from each of the scheduled cells based on frequency domain resource allocations (FDRAs) for the PDSCHs of each of the scheduled cells included in the received DCI,
   wherein the received DCI comprises information indicating a combination of the scheduled cells.

2. The method of claim 1, wherein the FDRAs are located continuously in the DCI.

3. The method of claim 1, wherein the information indicating the combination of the scheduled cells comprises one of multiple combinations of serving cells.

4. The method of claim 1, wherein the scheduled cells indicated by the information indicating the combination of the cells are one or more cells in a cell group.

5. The method of claim 1, wherein the FDRAs included in the DCI are arranged in a specified order.

6. A terminal in a wireless communication system, the terminal comprising:
   a transceiver; and
   at least one processor configured to:
      receive a radio resource control (RRC) message via the transceiver,
      identify, from the RRC message, information on a scheduling cell and a format for downlink control information (DCI) to be received and information related to a number of cells to be scheduled via the DCI,
      receive a DCI having the identified format, and
      receive a physical downlink shared channel (PDSCH) from each of the scheduled cells based on frequency domain resource allocations (FDRAs) for the PDSCHs of each of the scheduled cells included in the DCI,
   wherein the received DCI comprises information indicating a combination of the scheduled cells.

7. The terminal of claim 6, wherein the FDRAs are located continuously in the DCI.

8. The terminal of claim 6, wherein the information indicating the combination of the scheduled cells comprises one of multiple combinations of serving cells.

9. The terminal of claim 6, wherein the scheduled cells indicated by the information indicating the combination of the cells are one or more cells in a cell group.

10. The terminal of claim 6, wherein the FDRAs included in the DCI are arranged in a specified order.

11. A base station in a wireless communication system, the base station comprising:
   a transceiver; and
   at least one processor configured to:
      transmit, to a terminal by the transceiver, a radio resource control (RRC) message comprising information indicating a format for downlink control information (DCI) to be transmitted and information related to a number of cells to be scheduled via the DCI,
      transmit, to the terminal by the transceiver, the DCI having the format, and
      transmit, to the terminal by the transceiver, data based on frequency domain resource allocations (FDRAs) for physical downlink shared channels (PDSCHs) of the scheduled cells included in the DCI,
   wherein the DCI comprises information indicating a combination of the scheduled cells.

12. The base station of claim 11, wherein the FDRAs are located continuously in the DCI.

13. The base station of claim 11, wherein the information indicating the combination of the scheduled cells comprises one of multiple combinations of serving cells.

14. The base station of claim 11, wherein the scheduled cells indicated by the information indicating the combination of the cells are one or more cells in a cell group.

15. The base station of claim 11, wherein the FDRAs included in the DCI are arranged in a specified order.

* * * * *